US012506966B2

(12) United States Patent
Barcovschi et al.

(10) Patent No.: US 12,506,966 B2
(45) Date of Patent: *Dec. 23, 2025

(54) DIGITAL IMAGE CAPTURE DEVICE HAVING A PANORAMA MODE

(71) Applicant: Adeia Imaging LLC, San Jose, CA (US)

(72) Inventors: Igor Barcovschi, Galway (IE); George Susanu, Galway (IE); Serghei Carateev, Galway (IE)

(73) Assignee: Adeia Imaging LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,605

(22) Filed: Jan. 3, 2024

(65) Prior Publication Data

US 2024/0223903 A1 Jul. 4, 2024

Related U.S. Application Data

(63) Continuation of application No. 17/356,365, filed on Jun. 23, 2021, now Pat. No. 11,910,093, which is a
(Continued)

(30) Foreign Application Priority Data

Nov. 27, 2012 (IE) ..................... 2012/0509

(51) Int. Cl.
*H04N 7/00* (2011.01)
*H04N 23/62* (2023.01)
(Continued)

(52) U.S. Cl.
CPC .......... *H04N 23/698* (2023.01); *H04N 23/62* (2023.01); *H04N 23/63* (2023.01); *H04N 23/631* (2023.01); *H04N 23/635* (2023.01)

(58) Field of Classification Search
CPC ...... H04N 23/698; H04N 23/62; H04N 23/63; H04N 23/631; H04N 23/635
See application file for complete search history.

(56) References Cited

U.S. PATENT DOCUMENTS 9,736,370 B2 * 8/2017 Barcovschi .......... H04N 23/635
10,122,919 B2 * 11/2018 Barcovschi .......... H04N 23/635
(Continued)

FOREIGN PATENT DOCUMENTS

WO 2011069698 A1 6/2011
WO 2012032412 A2 3/2012
(Continued)

OTHER PUBLICATIONS

Claims in application No. PCT/EP2013/074423, dated May 2014, 1 page.
(Continued)

*Primary Examiner* — Howard D Brown, Jr.
(74) *Attorney, Agent, or Firm* — KPPB LLP (57) ABSTRACT

A hand-held digital camera has a touch-sensitive display screen ("touch screen") for image preview and user control of the camera, and a user-selectable panorama mode. Upon entering panorama mode the camera superimposes upon the touch screen a horizontal rectangular bar whose width and/or height are user-adjustable by interaction with the touch screen to select a desired horizontal sweep angle. After the sweep angle is set the camera automatically captures successive horizontally overlapping images during a sweep of the device through the selected sweep angle. Subsequently the camera synthesises a panoramic image from the successively captured images, the panoramic image having a width corresponding to the selected sweep angle.

16 Claims, 4 Drawing Sheets

Related U.S. Application Data continuation of application No. 16/176,538, filed on Oct. 31, 2018, now Pat. No. 11,070,723, which is a continuation of application No. 15/672,743, filed on Aug. 9, 2017, now Pat. No. 10,122,919, which is a continuation of application No. 14/646,368, filed as application No. PCT/EP2013/074423 on Nov. 21, 2013, now Pat. No. 9,736,370.

(60) Provisional application No. 61/748,070, filed on Dec. 31, 2012.

(51) Int. Cl.
*H04N 23/63* (2023.01)
*H04N 23/698* (2023.01)

(56) References Cited

U.S. PATENT DOCUMENTS

| | | | |
|---|---|---|---|
| 11,070,723 B2* | 7/2021 | Barcovschi | H04N 23/698 |
| 11,910,093 B2* | 2/2024 | Barcovschi | H04N 23/631 |
| 12,126,892 B2* | 10/2024 | Yin | G06F 3/04883 |
| 2007/0205992 A1* | 9/2007 | Gloyd | G06F 3/0233 |
| | | | 345/169 |
| 2010/0066810 A1 | 3/2010 | Ryu et al. | |
| 2010/0172589 A1 | 7/2010 | Ohki | |
| 2010/0321470 A1* | 12/2010 | Oshima | H04N 5/772 |
| | | | 348/E7.092 |
| 2011/0181690 A1* | 7/2011 | Yoshizumi | H04N 23/51 |
| | | | 348/37 |
| 2011/0249146 A1 | 10/2011 | Ishida | |
| 2011/0298888 A1 | 12/2011 | Shimada | |
| 2012/0019614 A1 | 1/2012 | Murray et al. | |
| 2013/0033566 A1 | 2/2013 | Sento | |
| 2013/0141524 A1* | 6/2013 | Karunamuni | G06T 3/4038 |
| | | | 348/38 |
| 2014/0210941 A1* | 7/2014 | Wang | H04N 23/698 |
| | | | 348/36 |
| 2014/0240575 A1 | 8/2014 | Kaneda | |
| 2014/0333718 A1* | 11/2014 | Chang | H04N 23/64 |
| | | | 348/36 |
| 2015/0271401 A1* | 9/2015 | Khoury | H04N 23/661 |
| | | | 348/36 |
| 2015/0312478 A1 | 10/2015 | Barcovschi et al. | |
| 2016/0071238 A1* | 3/2016 | Kimura | G06T 7/33 |
| | | | 348/36 |
| 2018/0063430 A1 | 3/2018 | Barcovschi | |
| 2019/0141239 A1 | 5/2019 | Barcovschi et al. | |
| 2021/0409598 A1 | 12/2021 | Barcovschi et al. | |

FOREIGN PATENT DOCUMENTS

| | | | |
|---|---|---|---|
| WO | 2012072606 A1 | 6/2012 | |
| WO | WO-2014082921 A2 * | 6/2014 | H04N 23/62 |
| WO | 2014082921 A3 | 7/2014 | |

OTHER PUBLICATIONS

International Preliminary Report on Patentability for International Application PCT/EP2013/074423, Report issued Jun. 2, 2015, Mailed on Jun. 11, 2015, 05 Pgs.

International Search Report and Written Opinion for International Application No. PCT/EP2013/074423, Search completed May 22, 2014, Mailed May 30, 2014, 07 Pgs.

Office Action for U.S. Appl. No. 16/176,538, mailed on Jan. 28, 2020, Barcovschi, "Digital Image Capture Device Having A Panorama Mode", 22 pages.

Office action for U.S. Appl. No. 16/178,538, mailed on Jul. 17, 2019, Barcovscni, "Digital Image Capture Device Having A Panorama Mode", 20 pages.

Office Action for U.S. Appl. No. 16/176,538, mailed on Jul. 8, 2020, Barcovschi, "Digital Image Capture Device Having A Panorama Mode", 28 pages.

\* cited by examiner (a)

DIGITAL IMAGE CAPTURE DEVICE HAVING A PANORAMA MODE

This Application is a continuation of U.S. patent application Ser. No. 17/356,365, filed Jun. 23, 2021, now U.S. Pat. No. 11,910,093, issued on Feb. 20, 2024, which is a continuation of U.S. patent application Ser. No. 16/176,538, filed Oct. 31, 2018, now U.S. Pat. No. 11,070,723, issued on Jul. 20, 2021, which was a continuation of U.S. patent application Ser. No. 15/672,743, filed Aug. 9, 2017, now U.S. Pat. No. 10,122,919, issued on Nov. 6, 2018, which was a continuation of U.S. application Ser. No. 14/646,368, filed on May 20, 2015, now U.S. Pat. No. 9,736,370, issued on Aug. 15, 2017, which was the National Stage of International Application No. PCT/EP2013/074423, filed on Nov. 21, 2013, which claimed the benefit of U.S. Provisional Patent Application No. 61/748,070, filed on Dec. 31, 2012, and of IE Patent Application No. S2012/0509, filed on Nov. 27, 2012, all of which applications are incorporated herein by reference in their entirety.

FIELD

The present invention relates to an image capture device.

BACKGROUND

Sweep panorama has become an innovative and exciting new method to acquire images on handheld digital image capture devices, such as digital cameras as well as devices such as mobile phones having a digital camera function. The panorama process involves the user holding the device in their hand and "sweeping" the device around a scene. Typically the user, holding the camera with the lens facing directly outwardly, swivels bodily through a desired angle to rotate the camera through typically a 180-360 degree field of view. During such sweep, multiple overlapping images are captured which are subsequently blended into a single, elongated image of the entire scene. An example of a prior art panorama acquisition is shown in FIGS. 1a and 1b.

Examples of such panorama techniques are disclosed in WO2011069698 (Ref: P98956EP00/FN-352-EP) and WO2012032412 (Ref: P103053PC00/FN-352C-CIP-PCT) and in particular, these documents disclose techniques for blending component images of a panorama image together in real-time during image acquisition.

Figure 1:
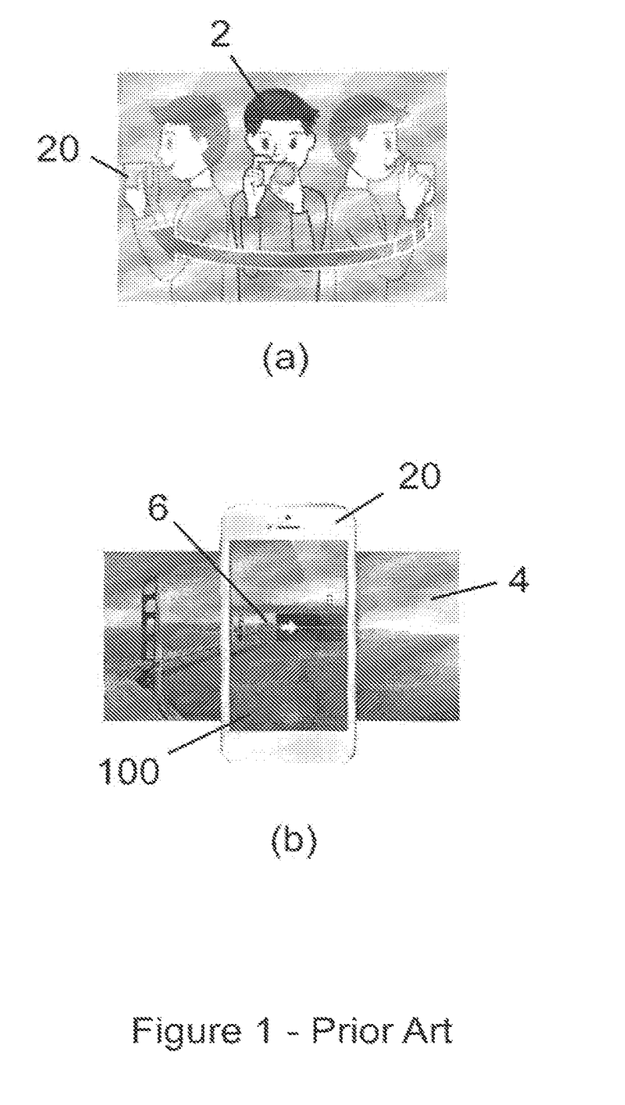
FIG. 1, previously described, illustrates a prior art panorama acquisition process.

FIG. 1a shows a user 2 holding a camera 20 facing outwardly while he sweeps though about 180 degrees. FIG. 1b shows the actual scene 4 being captured and the camera 20 (in this case a mobile phone) part way through the sweep. The camera display screen 100 shows the current part of the view being scanned, as well as a so-called rectangular picture-in-picture (PiP) window 6 which is progressively filled from one end by a reduced sized image of the scene as successive overlapping images are captured.

The capabilities of these devices have been sufficiently enhanced to enable high quality image sequences to be blended during the acquisition process to present a high quality stitched image to the user practically in real-time.

However most current implementations fix the size of the sweep and while they show the user the progress of acquisition there is no way for the user to gain an understanding of how the size (length) of the sweep picture-in-picture (PiP) window relates to their actual sweep angle as they rotate the camera.

To take full advantage of the potential of sweep panorama imaging on today's touch interface cameras there is a need for a more advanced and interactive user interface that (i) enables users to easily configure and understand the size and geometry of the settings for a sweep panorama acquisition; and (ii) to view and monitor progress of the sweep during the acquisition process.

SUMMARY

Accordingly, the invention provides a hand-held digital image capture device having a touch-sensitive display screen ("touch screen") for image preview and user control of the device, and a user-selectable panorama mode, wherein upon entering the panorama mode the device displays upon the touch screen a bar whose width and/or height are user-adjustable by interaction with the touch screen to select a desired horizontal sweep angle, wherein the device is arranged to automatically capture successive horizontally overlapping images during a sweep of the device through the selected sweep angle, and wherein subsequent to the sweep the device is arranged to synthesise a panoramic image from the successively captured images, the panoramic image having a width corresponding to the selected sweep angle.

It will be seen that the present invention allows a user to specify a sweep angle for a panorama image without needing to actually track the angular movement of a camera during image acquisition. It has been seen that even if a user's sweep deviates from a nominal circular arc during image acquisition, the angular field of view of the panorama image generated from the number of overlapping images calculated for the specified sweep angle does not deviate significantly from the selected angle and so produces a satisfactory result while at the same time usefully assisting the user in the capture of the panorama image.

Preferably, during the sweep the device displays upon the touch screen a pie chart showing the proportion of the defined sweep angle completed at any given time during the sweep.

The bar may serve as a PIP window during the sweep.

Preferably, the captured images are cropped in the vertical direction to allow for vertical movement of the device during a sweep.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 2:
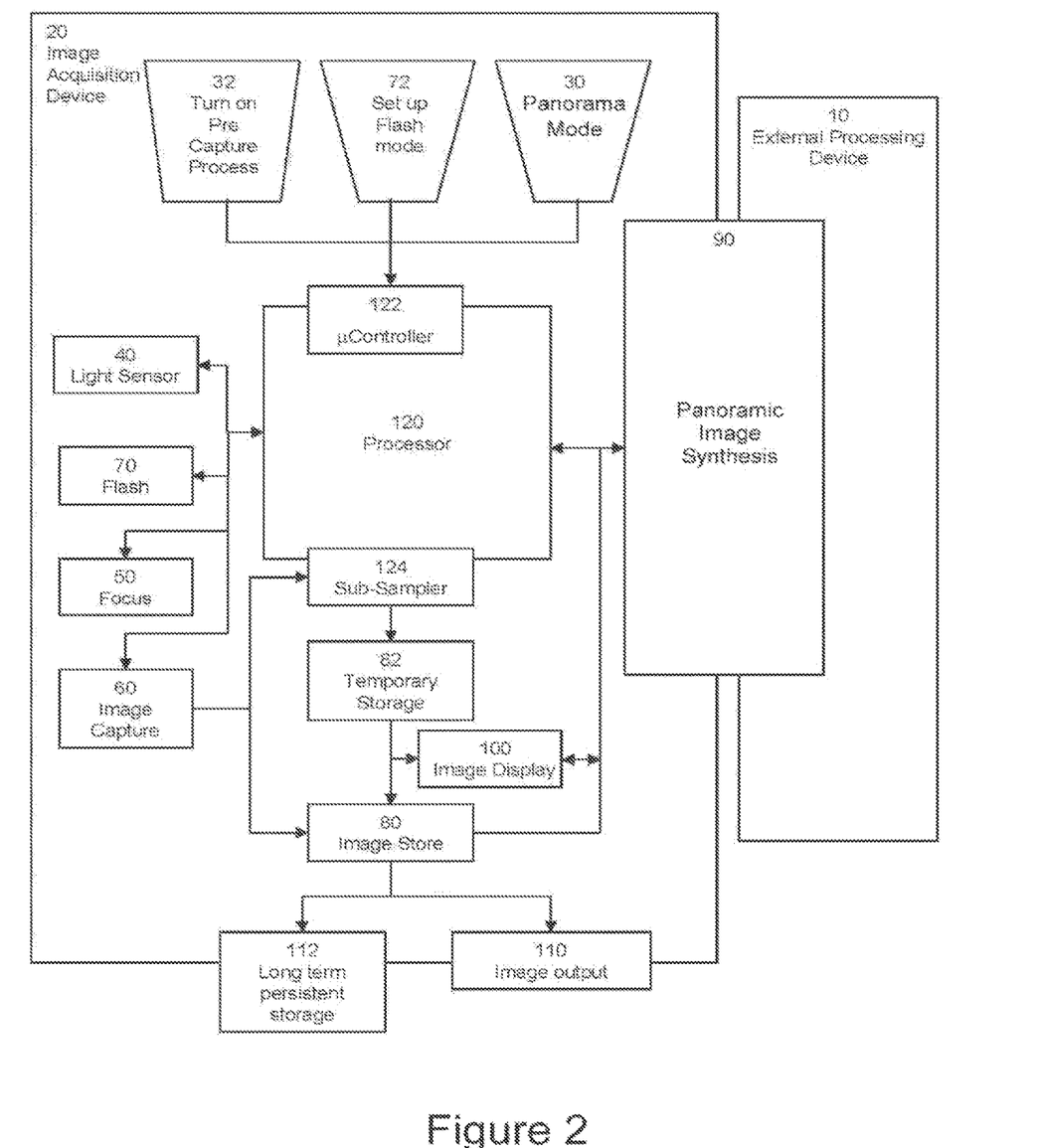
FIG. 2 is a block diagram of a digital camera embodying the present invention.
Figure 3:
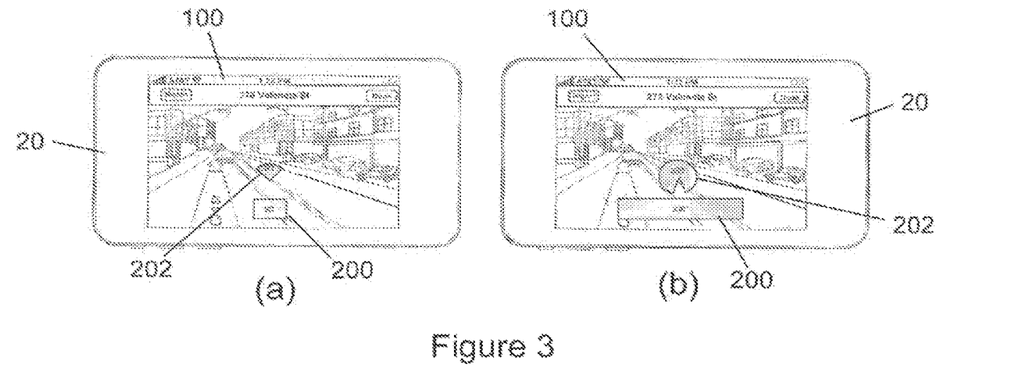
FIG. 3 are screen shots of a camera embodying the invention.
Figure 4:
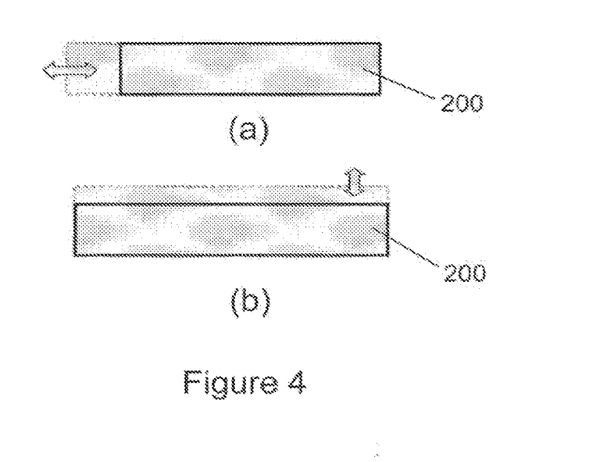
FIGS. 4 and 5 are diagrams of screen symbols appearing during operation of the camera in panorama mode.
Figure 5:
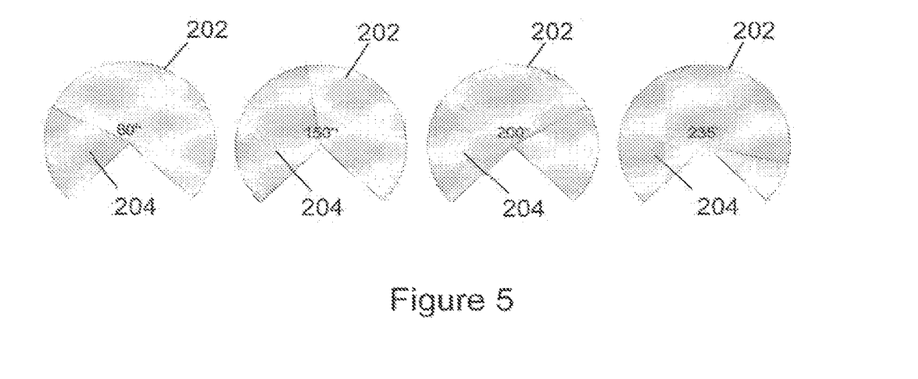

FIG. 2 is a block diagram of a hand-held digital image acquisition device 20. In the present embodiment the device 20 is a hand-held digital camera as such, but it could be the camera part of a cell phone or other hand-held device incorporating a digital camera function. All such devices are referred to herein as cameras for convenience whether or not that is their main function.

The camera 20 includes a digital processor 120. As is well known, many of the processes performed in or by the digital camera may be implemented in or controlled by software operating in the processor 120, including user interface functions and control of peripheral components. The camera 20 is equipped with a digital display screen 100 for preview and post-view of images. In the present embodiment the display screen 100 is a touch-sensitive screen ("touch screen") allowing a user to interact with the camera by touching and manipulating icons, symbols and other items displayed on the touch screen by the camera software. Touch screens are well-known and are usually placed on the rear of the camera body.

The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. If a flash is to be used, processor 120 causes the flash 70 to generate a photographic flash in substantial coincidence with the recording of a high resolution image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory.

Before the main (high resolution) image is captured, successive preview images are generated and displayed on the screen 100 to assist the user in composing the image, as well as being used to determine focusing and exposure in the pre-capture mode. Temporary storage 82 may be used to store one or more of the preview images and can be part of the image store 80 or a separate component. The preview images are preferably generated by the image capture component 60. For speed and memory efficiency reasons, preview images preferably have a lower pixel resolution than the main image taken when the shutter button is fully depressed, and are generated by sub-sampling a raw captured image using software 124 which can be part of the general processor 120 or dedicated hardware or combination thereof.

When the user is satisfied with the preview image the user fully presses down the shutter button to capture a high resolution main image.

In addition to the standard functions described above, the camera 20 has a user-selectable "panorama" mode. This mode may be selected by pushing a dedicated button 30 on the camera body, and/or by menu selection on the touch screen 100. (Indeed any interaction described above with a button, can equally be implemented via a touch screen function or in some cases via voice command interaction.) FIGS. 3 to 6 illustrate the use and operation of the camera 20 in panorama mode.

1. Upon entering the panorama mode the camera 20 superimposes a rectangular bar 200 upon the touch screen 100, FIG. 3a, whose edges are parallel to the edges of the screen 100. The horizontal width of the bar 200 is user-adjustable (FIG. 4a) to select a desired horizontal sweep angle for the panoramic image. This is done directly on the screen 100 by selecting an edge and stretching that edge, as shown for the left hand edge, or by using a two-finger pinch or stretch gesture. The adjusted length of the bar 200 corresponds to a desired sweep angle; i.e. the angle through which the user will rotate while swivelling from a desired start point to a desired end point of a scene for which a panoramic image is desired.

FIG. 3a shows the default width of the bar 200 when the panorama mode is first selected, corresponding to a sweep angle of 90 degrees. FIG. 3b shows the bar after horizontal stretching to correspond to a sweep angle of 330 degrees.

Certain embodiments may allow the user to adjust the height of the bar, FIG. 4b, as well as or instead of adjusting the width of the bar. This does not affect the height of the panoramic image, but selects the horizontal sweep angle as a function of bar height as well as, or instead of, bar width, since the bar height is normalised to the acquired image height.

As well as the bar 200, the camera also displays a pie chart 202 on the touch screen 100. The angle of the pie chart is the sweep angle currently selected by the bar 200, and changes as the sweep angle changes. This enables the user to understand and visualize the amount of rotation or swivel they will use to capture the full panorama image. Thus the pie chart angle is 90 degrees in FIG. 3a, and this has increased to 330 degrees in FIG. 3b. In some embodiments the sweep angle of the camera in panorama mode can be selected by manipulating the end points of the pie chart 202 on the touch screen 100. The result would be reflected on the bar 200, and it wouldn't be necessary to manipulate the bar directly.

2. Having selected the sweep angle, the user selects a desired zoom setting (if a zoom function is provided and if this needs to be changed from the zoom angle prior to entering panorama mode) and positions himself at his desired start position for the sweep with the camera lens facing directly away from him. The user then initiates the actual acquisition. This may be via an on-screen button, a physical button, a touch gesture, voice command or other means. Now the user rotates himself and the camera 20 smoothly towards the end position of the sweep, all the while keeping the camera lens facing directly away from him and attempting to maintain a constant height of the camera above the ground. During the sweep the camera automatically captures and stores successive horizontally overlapping images for synthesis either in real time or later into a panoramic image.

If C is the angular field of view of a single captured image at the selected zoom setting, OL is angular field of view of the overlap between adjacent captured images, and L is the angular sweep selected by the bar 200, the total number N of captured images needed to synthesise the panoramic image is given by:

$$L = N \times C - (N - 1) \times OL/2$$

OL is preferably selected by the camera so that N is a whole number. Different values of OL can satisfy the above equation for N as a whole number, so the value chosen for OL is the closest value to 15%. If OL is selected such that N is not a whole number, the number of images is rounded up and the final image cropped at a later stage.

The camera knows when the selected degree of overlap between adjacent images is reached by storing and comparing preview images. When the last 15% (or other selected overlap percentage) of one image matches the first 15% of the next image, the main high resolution image is captured.

During the sweep, the rectangular bar 200 can serve as a conventional PiP window. Also during the sweep, the camera superimposes upon the pie chart 202 the proportion 204 of the defined sweep angle completed at any given time during the sweep. This is shown diagrammatically in FIG. 5, where moving from left to right the pie chart 202 indicates a progressively increasing swept area 204.

3. When the camera determines that the camera has swept through the selected sweep angle set by the bar 200, the camera stops capturing images, irrespective of whether the user keeps rotating the camera beyond the end position, and signals this to the user, e.g. by a beep.

4. Subsequently the camera synthesises a panoramic image from the successively captured images, the panoramic image having a width corresponding to the selected sweep angle. Post-processing of the captured images is performed in a panoramic processor 90. The processor 90 can be integral to the camera 20 (for example, it could be the processor 120 with suitable programming) or part of an external processing device 10 such as a desktop computer. Where the processor 90 is integral to the camera 20, the final processed image may be saved on a persistent storage 112 which can be internal or a removable storage such as CF card, SD card or the like, or downloaded/uploaded to another device via image output means 110. It will be seen that in embodiments where the processor 90 is implemented in an external device 10, or where the processor does not synthesise images during the acquisition process, the device may not be able to display the blended acquired portion of the panorama image in the PiP window 6 during an image acquisition.

In certain embodiments of the invention, the user may not alone be concerned with acquiring a panorama image having a given sweep angle, but also that the image would have a specified aspect ratio, corresponding to the selected proportions of the rectangular bar 200. In such embodiments, on entering panorama mode, the bar 200 and pie chart 202 can be first displayed with proportions and an angle respectively corresponding to a single acquired image. The user then interacts with the bar and/or pie chart, adjusting the width and/or height of the bar or the pie chart angle to specify a panorama image with a given aspect ratio. (it will therefore be appreciated, that the first adjustment of the bar thus needs to either stretch the width, or compress the height of the bar, to select a panorama image with a greater width to height aspect ratio than a single image for a given zoom angle.) In embodiments of the invention where the rectangular bar acts as a PiP window during acquisition, allowing the user to compress the height of the bar, allows the user to specify proportionally less screen real estate for the bar during the image acquisition and so to allow the user to capture more of any given single scene. Equally, the panorama mode can allow the user to drag the bar 200 and/or the pie chart 202 around the screen to position these where desired before image acquisition begins.

As mentioned above, the user attempts to maintain a constant height of the camera above the ground during image acquisition. However, this is rarely possible and as such, by default it would not be possible to capture a panorama image with a given aspect ratio without blank sections within the image, for example, sections 502 in FIG. 6 caused by the user dipping the camera during image capture.

Embodiments of the present invention can however take advantage of the feature of cameras typically acquiring a greater field of view than is displayed to a user within the display 100. In some devices, each captured image (frame, hereafter) is cropped in the vertical direction by a fixed percentage, say 15% before display. This leaves only 85% of each frame for use in the synthesis, but this is normally acceptable and by adjusting the precise position of the crop lines in each frame, the frames can be horizontally aligned, so that the user can acquire a panorama image with a given aspect ratio through a selected sweep angle, but without necessarily either loosing sections of the image which were previewed during image capture or having to tolerate blank sections within the panorama image and possibly having to trim the image and so adjusting the aspect ration.

There are several possible techniques. In the first, a decision is made to use, say, 85% of the frame height as the "crop height" of the final panorama. Then as long as the user doesn't move more than, say, 15% off the horizontal path during the sweep a valid panorama is provided. In such embodiments, the relative vertical alignment of the captured image frames is determined during image acquisition and if the total frame deviation from the initial image deviates by more than 15% during acquisition, a warning can be provided to the user. The user can therefore cancel image acquisition and start again or accept than the panorama image might not be optimal either in content or aspect ratio.

A first cropping technique is shown in FIG. 6a. Y"0 is the y value (vertical) of the top of first frame, Y'0 is the y value of the bottom of first frame, Y"0–Y'0 give the 100% frame height value, Yf, Y"min is the value of the lowest top of frame y-value, and Y'max is the y value of the highest bottom of frame value. (Y"min–Y'max)/Yf gives % crop—for the example shown, say 91% which is greater than the threshold of 85%. To maintain aspect ratio you need to crop at (a) Y"min–3% Yf and (b) Y'max+3% Yf.

A second technique, FIG. 6b, shows the same frame sequence. In this case the panorama is cropped at Y"min and Y'max so the (relative) height is 91%, rather than 85%. In this case the aspect ratio will vary between the threshold of 85% and 100% so the rectangle does not set the aspect ratio, but only the horizontal length of the rectangle is used to set the "length in pixels" of the final panorama. However this length still corresponds to the circumscribed angle.

A third technique uses the height of the original frame as a fixed crop reference and show "black areas" where the frame top drops below the Y"0 value or where frame bottom rises above the Y'0 value. Where the top moves above the Y"0 value, or bottom below the Y'0 value then that portion is cropped. In this case one gets a fixed aspect ratio at 100% of the frame height and the user can crop the panorama later to eliminate the black areas (if they wish).

A fourth technique is where the height of the panorama is allowed to increase to the maximum Y" (frame top) and the minimum Y' (frame bottom) values. In this case the panorama has a height of >100% of frame height and there will be even more black areas. As for the second technique this will have a variable aspect ratio and the user would be expected to crop it later. It does keep the most of the actual panorama content but is probably the least useful as large black areas could create a poor impression with users.

In the above described embodiments, a single overlap figure OL is used to calculate the number of images which are to be acquired to provide a panorama image with a given sweep angle and possibly aspect ratio. However, it will be seen that this figure can be variable and indeed varied during acquisition. So for example, the overlap figure might vary according to the zoom angle chosen by the user for image acquisition.

Figure 6:
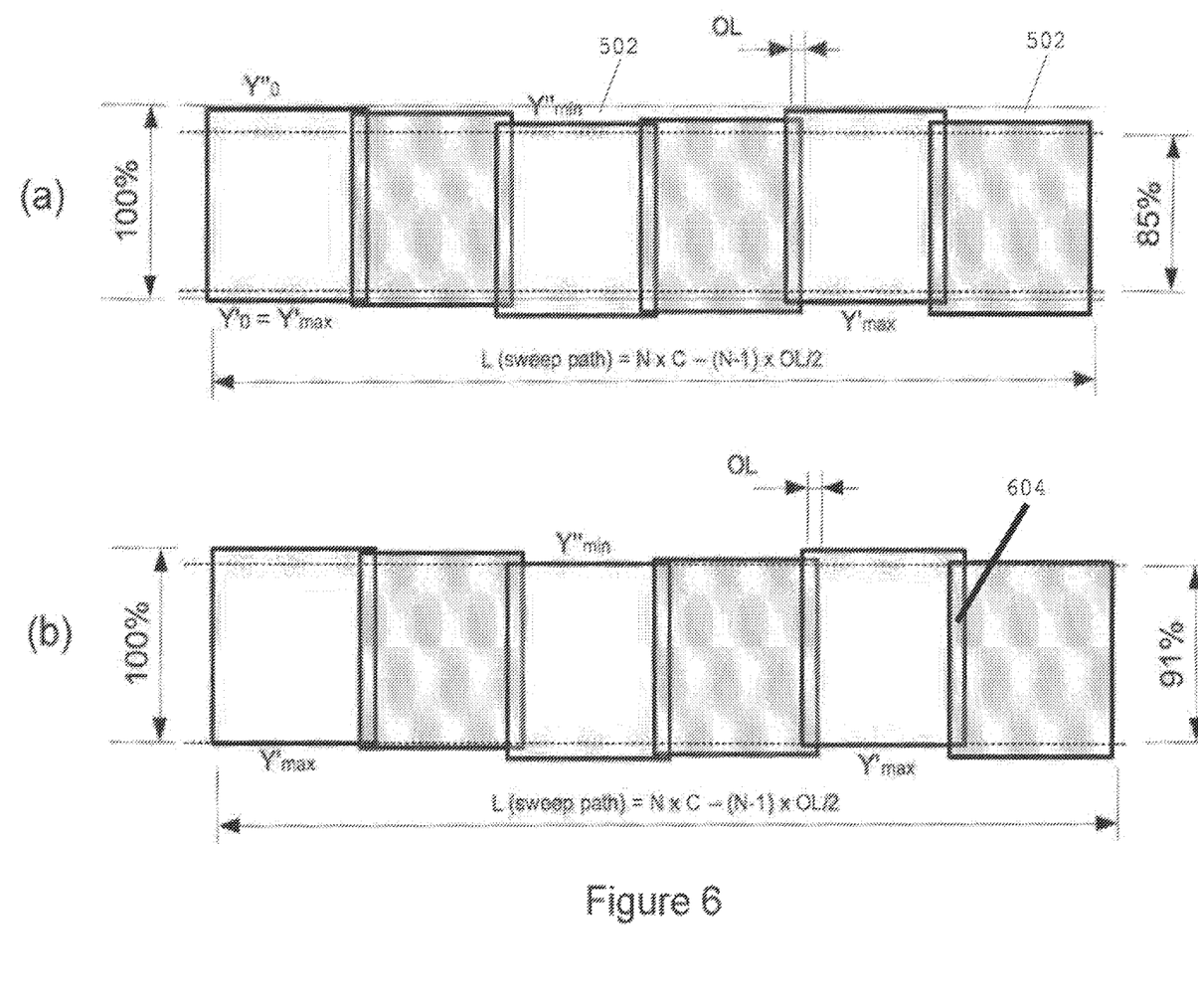
FIG. 6 are diagrams showing height cropping during image synthesis.

Also, it will be appreciated that it may not be desirable to blend to images together where there is a large foreground object in the overlap region, for example, region 604 in FIG. 6, and where the stitch line might tend to pass through the foreground object. This can either cause a particularly visible stitch line where it passes through the foreground object or cause visible distortion of the object from one side of the stitch line to the other. Thus, in cases such as this, where a foreground object is detected in a leading portion of a given acquired image N, the next acquired image N+1 can be acquired so that it overlaps the image N to the extent that the foreground object lies completely with image N+1 and preferably with a margin on the trailing edge of image N+1 through which image N and N+1 can be blended. Such a technique is particularly useful in a device including face tracking where areas within a captured image including a face are identified. Thus, if such a region is picked up at the leading edge of a field of view appropriate adjustment of the overlap can be made to accommodate blending around this region. Such adjustment of the overlap between one or more pairs of successive images is made during image acquisition, will of course require adjustment of the total number of images to be acquired to capture a panorama image spanning the selected sweep angle.

Further variations of these embodiments are possible, so for example, in some implementations where the rectangular bar 200 is not to act as a PIP window during image acquisition, only the pie chart 202 need be displayed.

While the above described embodiments do not rely on input from an inertial sensor, they do exclude the possibility of availing of such input if it is available.

Equally, while some of the above described embodiments provide a warning to a user who might be moving the camera vertically during image acquisition, it is also possible to warn the user if their rate of sweep is too quick or too slow, for example as described in WO2012072606 (Ref: P103008PC00/FN-368-PCT). This can be based on a measure of the rate of horizontal angular movement provided by an inertial sensor; or indeed based on the rate of change of overlap from one acquired image to the next. If this is too great, then the camera may not capture a component image at close enough to the required amount of overlap to provide an accurate result; or indeed to allow the device to blend and display the panorama image in real-time. On the other hand, if panning is too slow, there is a likelihood of greater vertical movement between images and this should be avoided.

The invention is not limited to the embodiment(s) described herein but can be amended or modified without departing from the scope of the present invention.

The invention claimed is:

1. A computer-implemented method, comprising:
   obtaining, using an imaging device, a first input indicating a shooting direction;
   obtaining a second input comprising a half press of a shutter button of the imaging device;
   focusing, based on the second input, on a subject;
   obtaining a third input comprising a full press of the shutter button of the imaging device;
   displaying a progress bar;
   capturing, in response to the third input and as the imaging device moves in the shooting direction, a plurality of images of the subject; and
   updating, during the capturing, the display of the progress bar.

2. The method of claim 1, wherein the first input comprises a touchscreen input of a touchscreen of the imaging device.

3. The method of claim 1, wherein the first input comprises an input of a button of the imaging device.

4. The method of claim 1, wherein the progress bar comprises a rectangular bar superimposed over an image of the subject.

5. The method of claim 1, further comprising generating, using the imaging device and based on the captured plurality of images, panoramic image data.

6. The method of claim 5, further comprising adjusting, using the imaging device and based on motion of the imaging device during the capture of the plurality of images of the subject, at least one image of the plurality of images of the subject.

7. The method of claim 1, wherein:
   the first input comprises a horizontal shooting direction; and
   the plurality of images of the subject comprises horizontally overlapping images.

8. The method of claim 1, wherein:
   the first input comprises a vertical shooting direction; and
   the plurality of images of the subject comprises vertically overlapping images.

9. A device, comprising:
   a display;
   a processor;
   at least one input device; and
   memory storing instructions that, when read by the processor, cause the device to:
      obtain a first input indicating a shooting direction;
      obtain, using the at least one input device, a second input comprising a half press of a shutter button of the device;
      focus, based on the second input, on a subject;
      obtain, using the at least one input device, a third input comprising a full press of the shutter button of the device;
      display, using the display, a progress bar;
      capture, in response to the third input and as the imaging device moves in the shooting direction, a plurality of images of the subject; and
      update, during the capture, the display of the progress bar.

10. The device of claim 9, wherein:
    the at least one input device comprises a touchscreen; and
    the first input comprises a touch input.

11. The device of claim 9, wherein:
    the at least one input device comprises a button; and
    the first input comprises an input of the button of the imaging device.

12. The device of claim 9, wherein the progress bar comprises a rectangular bar superimposed over an image of the subject.

13. The device of claim 9, wherein the instructions, when read by the processor, further cause the device to generate, based on the captured plurality of images, panoramic image data.

14. The device of claim 13, wherein the instructions, when read by the processor, further cause the device to adjust, based on motion of the imaging device during the capture of the plurality of images of the subject, at least one image of the plurality of images of the subject.

15. The device of claim 9, wherein:
the first input comprises a horizontal shooting direction; and
the plurality of images of the subject comprises horizontally overlapping images.

16. The device of claim 9, wherein:
the first input comprises a vertical shooting direction; and
the plurality of images of the subject comprises vertically overlapping images.

* * * * *